United States Patent [19]

Wied et al.

[11] Patent Number: 4,856,460
[45] Date of Patent: Aug. 15, 1989

[54] FLUIDIZED BED COMBUSTION

[75] Inventors: Edwin Wied, Alsting, France; Josef Glezerman, Frankfurt, Fed. Rep. of Germany

[73] Assignee: Inter Power Technologie, Fed. Rep. of Germany

[21] Appl. No.: 268,622

[22] Filed: Nov. 2, 1988

Related U.S. Application Data

[63] Continuation of Ser. No. 108,535, Oct. 15, 1987, abandoned.

[30] Foreign Application Priority Data

May 9, 1987 [DE] Fed. Rep. of Germany ....... 3715516

[51] Int. Cl.$^4$ .............................................. F22B 1/00
[52] U.S. Cl. .................................... 122/4 D; 110/245
[58] Field of Search ............... 110/245, 216; 122/4 D; 432/8.58

[56] References Cited

U.S. PATENT DOCUMENTS

| 4,241,672 | 12/1980 | Tuttle | 110/245 |
| 4,301,771 | 11/1981 | Jukkola et al. | 110/245 |
| 4,473,033 | 9/1984 | Strohmeyer, Jr. | 110/245 |
| 4,552,203 | 11/1985 | Chrysostome et al. | 110/245 |
| 4,565,139 | 1/1986 | Sage et al. | 110/245 |
| 4,617,877 | 10/1986 | Gamble | 110/245 |
| 4,665,865 | 5/1987 | Zubrod | 122/4 D |
| 4,708,092 | 11/1987 | Engstrom | 110/245 |
| 4,709,663 | 12/1987 | Larson et al. | 110/245 |
| 4,712,514 | 12/1987 | Xu-Yi et al. | 122/4 D |

Primary Examiner—Henry C. Yuen
Attorney, Agent, or Firm—James Creighton Wray

[57] ABSTRACT

The invention concerns a fluidized bed combustion system equipped with a tuyère bottom to feed it combustion and carrier air and with a fuel intake that penetrates into the lower part of the combustion chamber, also equipped with devices to separate solid particles borne by the flue gases and with devices for their feedback into the fluidized bed.

4 Claims, 2 Drawing Sheets

FLUIDIZED BED COMBUSTION

This application is a continuation of copending application Ser. No. 108,585 filed Oct. 15, 1987, now abandoned.

BACKGROUND OF THE INVENTION

Fluidized bed combustion systems are presently used more and more due to the advantages over grate or dust combustion systems and because one can burn solid fuels in them, especially coal. Due to the relatively low combustion temperatures in the fluidized bed, (which are in the vicinity of approximately 800° to 900° C.), fluidized bed combustion is characterized by a relatively low emission of toxic substances, especially by a low generation of nitrogen oxide. Absorption agents to bind the sulfur oxides generated during combustion can be directly included into the fluidized bed and can be extracted, together with the ash, following the reaction with the sulfur oxides. An important additional advantage of fluidized bed combustion systems consists in the large range of the coal that may be utilized, i.e. especially ballast rich coal may be employed.

It is known to separate solid particles borne by flue gas with cyclones placed outside the fluidized bed combustion, or with swirling chambers configured directly above the fluidized bed, and, due to their high coal or coke component, to feed the particles back into the fluidized bed.

However, cyclones, and especially swirling chambers, are relatively complex.

An important additional disadvantage of known fluidized bed combustion systems can also be found in the fact that, depending on varying loads, it is impossible to configure the fuel feed or the combustion performance quickly and problem free.

SUMMARY OF THE INVENTION

Thus, the invention is based on the concept of continuing the development of a fluidized bed combustion system of the type mentioned above, with the aim of obtaining an optimal performance adjustment and also a simple and effective separation and feedback of the solid particles from the flue gases. Additionally, a sufficiently long combustion duration of the coal particles borne in the flue gases should also be guaranteed.

According to the invention, this task is solved by installing a deflection device with a separation chamber above the fluidized bed, within the flue gas current. The total deflection of the flue gases is of approximately 360 degrees. The fuel feed has been configured as a fluidized bed channel with its own tuyère bottom, arranged before the combustion chamber, and of a feed line for a mixture of fuel and cooled bed material. The feedback of the solid particles from the separation chamber takes place via the feed line. Adequately, the deflection device has two flow cross-sections, that are orthogonal to one another, through which raw gas flows. The gas flows first through one and then through the other cross-section. The first flow cross-section has been configured at an angle of >45° C. in regard to the arriving raw gas flow.

On one hand, the proposed total system leads to a considerable improvement of the regulation characteristics of the fluidized bed, and on the other hand, it produces a simple and effective separation of the coarser solid particles from the flue gases. The configuration of the deflection device and of the separation chamber within a very small volume guarantees a sufficiently long flow trajectory that is necessary for the proper combustion of the finer coal particles.

The separation chamber has been placed favorably in the flow path of the flue gases, between the first and the second flow cross-section of the deflection device. The separation chamber serves for the deflection of flue gases from their outlet from the first flow cross-section to the inlet of the second flow cross-section, and, at the same time, due the strong deflection of the flue gases by 270° C. the solid particles carried by these are, to a large extent, separated.

An especially favorable configuration of the deflection device is achieved in regard to fluid flow technology if the flow cross-sections are subdivided into narrow lanes with parallel flow and, if alternatingly, one lane of the first flow cross-section and one lane of the second flow cross-section are configured next to one another. This accomplishes that apart from the deflection by 270° C. in the deflection chamber, no additional sideways deflection of the flue gases is necessary inside this chamber, since both flow cross-sections are nearly on one and the same plane.

The separated solid particles are fed back directly into the ash extraction channel or into the feed line for the fuel/bed material mixture.

The fuel/bed material mixture is first transported into a fluidized bed channel that has been placed in a stage prior to the combustion chamber. Due to the circumstance that the fluidized bed channel placed in this manner has its own tuyère bottom with an air feed device that is adjustable independently from the carrier air, the fuel admission can be adjusted along a wide range by the expansion of the fluidized bed that has been placed prior to this stage, or with the airspeed of the additional tuyère bottom. The separation of air thus achieved is automatically coupled to a stepped air feed device which has a beneficial effect on the reduction of NOx. Thus, via the fluidized bed with its own tuyère bottom placed in the previous stage, the fuel admission can be easily and quickly adjusted to the varying load requirements of the combustion system. The unfavorably perceived adjustment characteristics of fluidized bed combustion systems in the case of necessary load changes is considerably improved by the system proposed in the present invention.

Additionally, the fuel is not introduced alone, but in a mixture with part of the bed ash that is to be removed from the fluidized bed. The thorough mixture of these materials already took place in the fluidized bed of the previous stage. In this way, we avoid that inside the combustion chamber undesired fuel concentrations are produced by the fuel feed.

Additional explanations of the invention can be seen in FIGS. 1 and 2 of the schematic drawing of the implementation example.

DETAILED DESCRIPTION OF THE DRAWINGS

Figure 1:
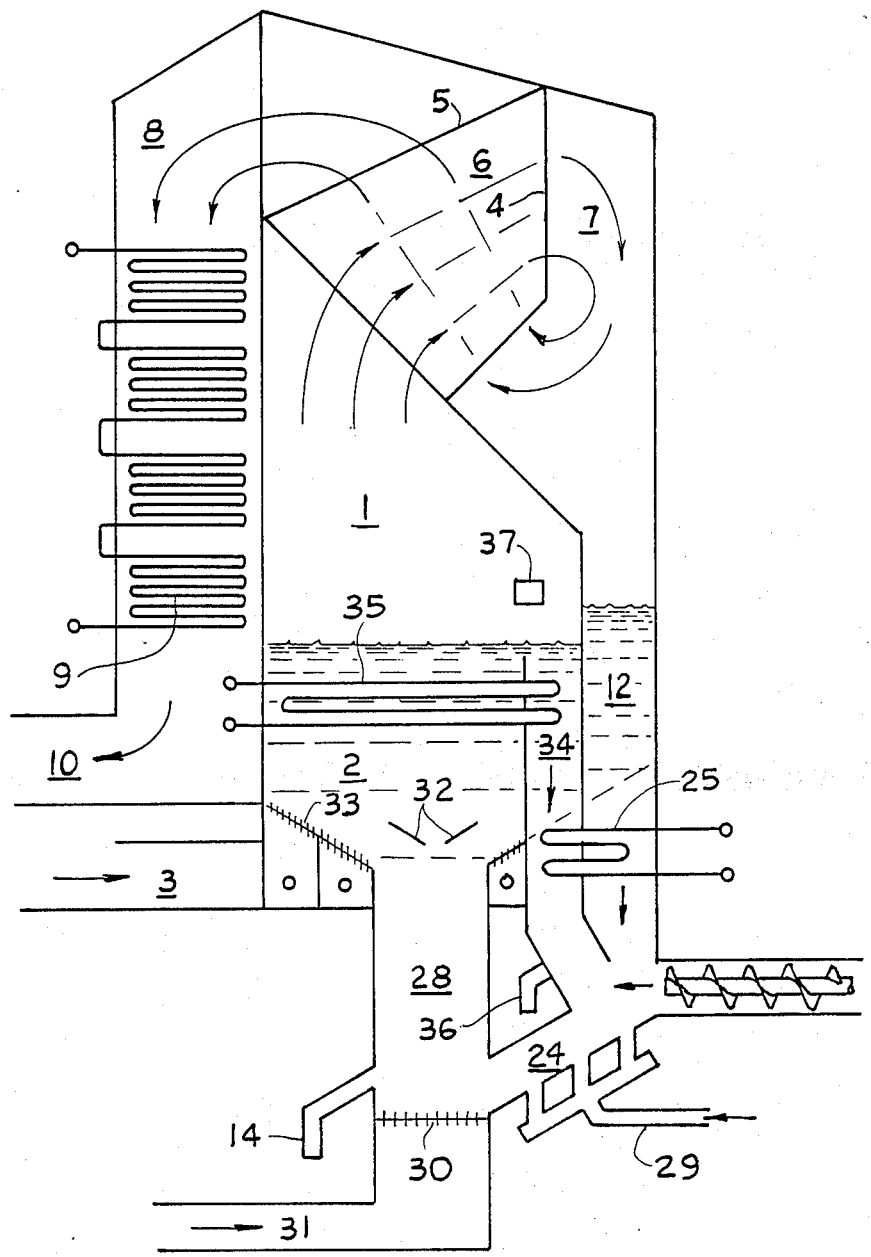

FIG. 1 schematically shows a fluidized bed combustion system 1 with a fluidized bed 2 in which a fuel, such as, for example, ballast coal, is burned at temperatures between 800° C. and 900° C. The fluidized bed 2 contains a mixture of about 99% inert materials and approximately 1% carbon.

The generated heat is transferred to the compressed working medium via immersion heating surfaces 35.

The flue gases are extracted via the deflection device 6 and the separation chamber 7.

Inside the fluidized bed an ash extraction channel 34 has been installed, the upper end of which has been configured as an overflow, reaching nearly to the level limit of the fluidized bed 2. The bed height is unequivocally given by this overflow. Changes in specific weight have no influence on the minimal bed height.

The initially still hot ash that flows through the overflow into the ash removal channel 34 first passes through a schematically drawn heat exchange unit 25 and is cooled there to approximately 400° C. to 500° C. At these temperatures part of the bed ash can be evacuated via a extraction channel 36. The remainder is mixed with coal particles whose kernel size have maximum of approx. 10 mm, which are added via a mechanical conveyor device 26 (i.e. a coal feeder, conveyor screw or cell wheel) from a supply container. Should it be necessary for the binding of sulfur oxides, absorption agents such as limestone can be fed in with the coal.

During the mixing of coal with the warm bed ashes the coal is dried, and, depending on the type of coal utilized, it is also more or less degassified. If the gases contain combustible components, they can be burned inside the combustion chamber of the coking unit by adding secondary air 37.

Gravity makes the mixture of ashes and coal flow through the feed line 24, which ends in a fluidized bed channel 28. If necessary, to loosen up and to make the flow of solids inert, flue gases can be fed through corresponding nozzles 29 into the feed line 24.

The solid particles inside the fluidized bed channel 28 are transported into the fluidized bed 2 with air, which is fed in through a line 31 and through the tuyère bottom 30, and are evenly distributed in the fluidized bed. Additional mechanical devices 32 in the inlet area of the fluidized bed channel 28 improve the even feed into the fluidized bed 2.

In an adequate manner, the tuyère bottom 33 of the fluidized bed 2 has been configured with a slope in the direction of the outlet of the fluidized bed channel 28. In this case the evacuation of the fluidized bed 2 can take place by way of a fluidized bed channel 28 and an ash evacuation device 14 placed at the tuyère bottom 30.

The described configuration makes it possible to obtain favorable regulation characteristics of the combustion system. The adjustment for partial loads is initially implemented by modifying the bed temperature.

By modifying the delivery of air flowing through the tuyère bottom 30 the fuel feed can be additionally accelerated by the mechanical conveyor device. In the event of major load changes the amount of combustion and carrier air flowing through the tuyère bottom 33 can be modified, such as, for example, by switching on or off a section of the nozzles located around the periphery of the fluidized bed.

Startup of the installation preferably takes place through a fluidized bed channel 28 by first lighting up the startup fuel within this area. In this way, the requirements for secondary energy are considerably reduced, since it is only necessary to heat the fluidized bed channel, which is small in relation to the fluidized bed proper.

The flue gases evacuated from the fluidized bed combustion chamber 1 first flow through one of the first flow cross-sections 4 by being deflected by the deflection device 6 by an angle of >45° C. The gases are then deflected by additional 270° C. in the separation chamber 7, and then flow through a second flow cross-section 5 of the deflection device 6. The second flow cross-section 5 is generally placed in an orthogonal direction in relation to the first flow cross-section 4. Following this, in the illustrated example, the flue gases flow through a steam generator 8 placed following it and there they give off their heat through the heat exchanger bundles 9 to the water to be evaporated. The cooled flue gases are then finally evacuated through line 10.

Due to the strong flue gas deflection by approximately 270° C. the larger solid particles borne by the gas coming from the fluidized bed 2 are to a large exent separated within the separation chamber 7. Due to the long flow trajectory of the flue gases, this guarantees a sufficiently long transit time of the airborne coal or coke particles, which is necessary for a good combustion of the same.

The solid particles separated from the flue gases in the separation chamber 6 are fed back into the fluidized bed 2 through the feed-back channel 12, or they are transported by way of a heat exchanger 25 to be mixed with the added fuel inside the feed line 24. The feed-back channel 12 can also flow into the evacuation channel 34.

Figure 2A:
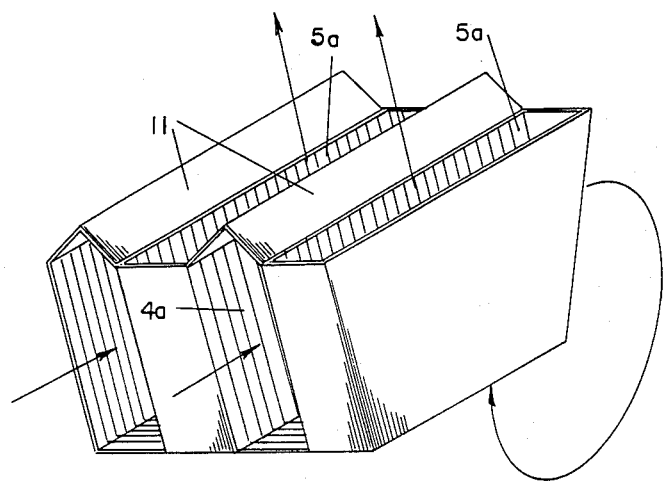

According to FIG. 2a, both flow cross-sections 4 and 5 of the deflection device 6 are subdivided into several flow lanes 4a and 5a, that are placed parallel to one another, and—similar to a cross-current plate heat exchanger—lanes 4a and 5a are placed alternatingly next to one another. It is appropriate to place the lid plates 11 of the lanes 4a at an angle towards the lane side walls so, that they form an inclination or a double inclination and the dust settling at this location will eventually fall back into the separation chamber 7 and the channel 12.

Figure 2B:
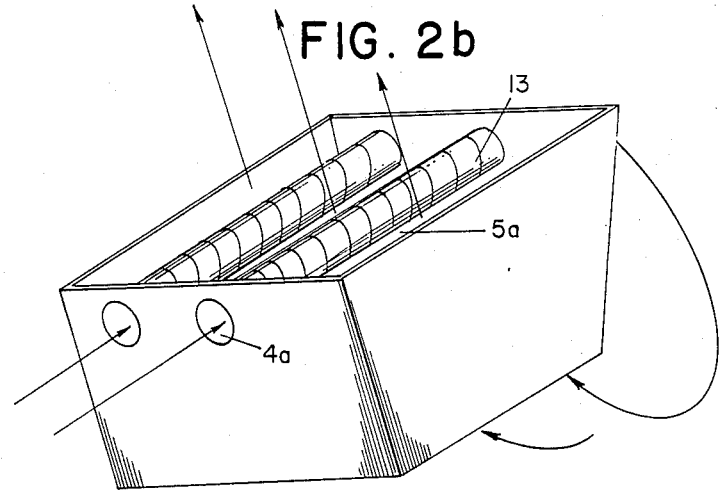

However, the deflection device 6 can also be configured according to the principle of a common cross current pipe heat exchanger. In FIG. 2b the heat exchanger pipes 13 form the lanes 4a of the first flow cross-section 5. The possibility also exists that the heat exchanger pipes 13 form the lanes 5a of the second flow cross-section 5.

I claim:

1. A fluidized bed combustion with a tuyère bottom for the admission of combustion and carrier ari, as well as a fuel feed entering a combustion chamber from below, with devices for the separation of solid particles borne by fluid gases and for their feedback into the fluidized bed, comprising:

a deflection device with a separation chamber placed above the fluidized bed, within a flue gas current, the total deflection of the gases being approximately 360° C., wherein the fluid device has been configured with a first flow cross-section and with a second cross-section, wherein further the first flow cross-section has been placed at an angle of greater than 45 in relation to an incoming flue gas current and the second cross-section is essentially orthogonal to the first flow cross-section, wherein an output of the first flow cross-section and an input of the second flow cross-section are connected via the separation chamber wherein the first and second flow cross-sections are both subdivided into subchannels arranged parallel to a flow direction and wherein the subchannel of the first flow cross-section and the subchannel of the second flow cross-section are configured next to one another in an alternating manner, wherein the deflection of the flue gas flow within the sepration chamber is approximately 270°;

a fuel feed configured as a fluidized bed channel and placed upstream from the combustion chamber, with its own tuyère bottom;

a feed line providing a mixture of fuel and cooled bed material; and a feedback of the solid particles taking place from the separation chamber into the feed line.

2. The fluidized bed combustion according to claim 1, wherein lid plates of the subchannels are arranged towards a subchannel side wall.

3. Fluidized bed combution according to claim 1, wherein further the feed line enters the fluidized bed channel above the tuyère bottom and an adjustable air supply is independent from a carrier air for the fluidized bed.

4. The fluidized bed combustion according t claim 1, wherein further mechanical devices are provided within an area of an inflow of the fluidized bed channel into the fluidized bed, and wherein the mechanical devices are provided within the fluidized bed for the distribution of a mixture of fuel, bed material and feedback solid particles.

* * * * *